United States Patent [19]

Porter

[11] Patent Number: 4,789,171
[45] Date of Patent: Dec. 6, 1988

[54] MULTIPURPOSE BARROW VEHICLE

[76] Inventor: Lynn L. Porter, R.F.D. 1, Box 1802, Bangor, Me. 04401

[21] Appl. No.: 72,838

[22] Filed: Jul. 13, 1987

[51] Int. Cl.$^4$ ............................................... B62B 1/04
[52] U.S. Cl. ................................ 280/47.18; 280/47.26; 280/47.33
[58] Field of Search ............... 280/47.18, 47.31, 47.33, 280/653, 654, 655, 292, 47.26, 47.24

[56] References Cited

U.S. PATENT DOCUMENTS

| | | |
|---|---|---|
| 1,255,222 | 2/1918 | Potts . |
| 2,256,038 | 9/1941 | Woodruff ...................... 280/47.18 X |
| 2,725,242 | 11/1955 | Peplin ............................ 280/47.18 X |
| 2,742,300 | 4/1956 | Carver .............................. 280/47.31 |
| 2,980,442 | 4/1961 | Krokos et al. . |
| 3,260,547 | 7/1966 | Heilig et al. . |
| 3,936,070 | 2/1976 | Owings ................................. 280/47.18 |
| 4,052,079 | 10/1977 | Lehman .............................. 280/47.2 |
| 4,227,709 | 10/1980 | Gradwohl et al. .......... 280/47.18 X |

Primary Examiner—John J. Love
Assistant Examiner—Michael Mar
Attorney, Agent, or Firm—Eugene Chovanes

[57] ABSTRACT

A two-wheeled convertible barrow vehicle adapted to, on one hand, be used in a conventional wheelbarrow manually operated fashion and, on the other hand, converted to and used as a trailer hitched to a power-operated vehicle. Conversion is achieved by the use of elements secured in brackets having bent portions which when secured on the frame of the barrow in one relationship provide diverging arms for manual operation, and when switched in the brackets result in a converging arrangement to provide a tow bar to be hitched to a power vehicle. The vehicle can be stored in a vertical position with the arms tucked underneath. The barrow of the vehicle can be selectively dumped with respect to the frame, or dumped in the usual wheelbarrow tilting arrangement.

8 Claims, 3 Drawing Sheets

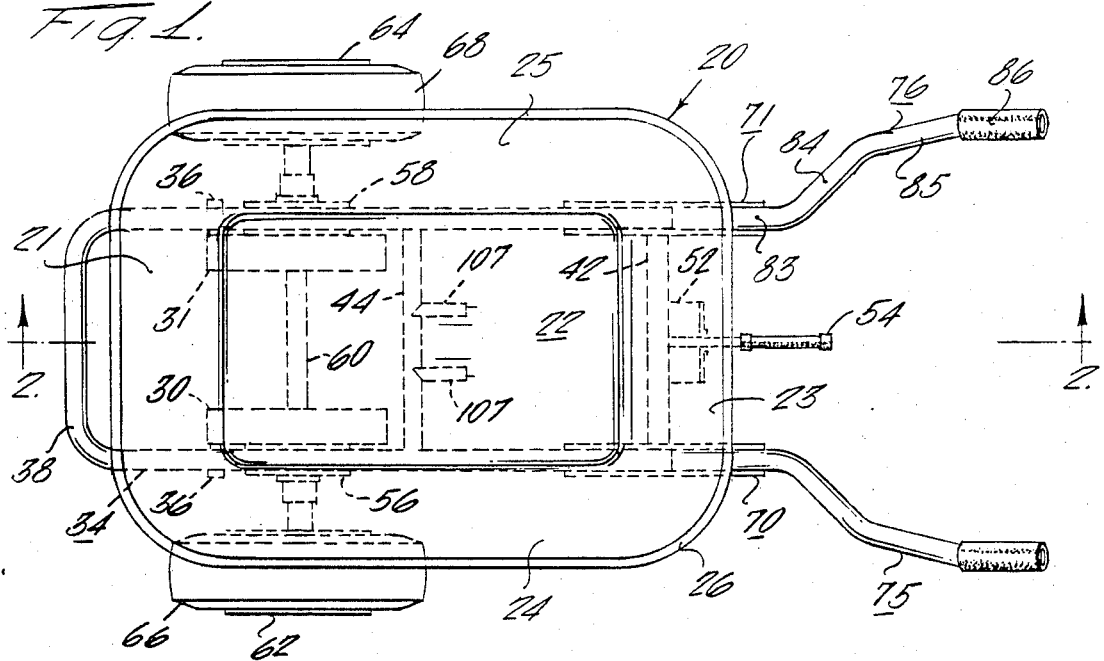
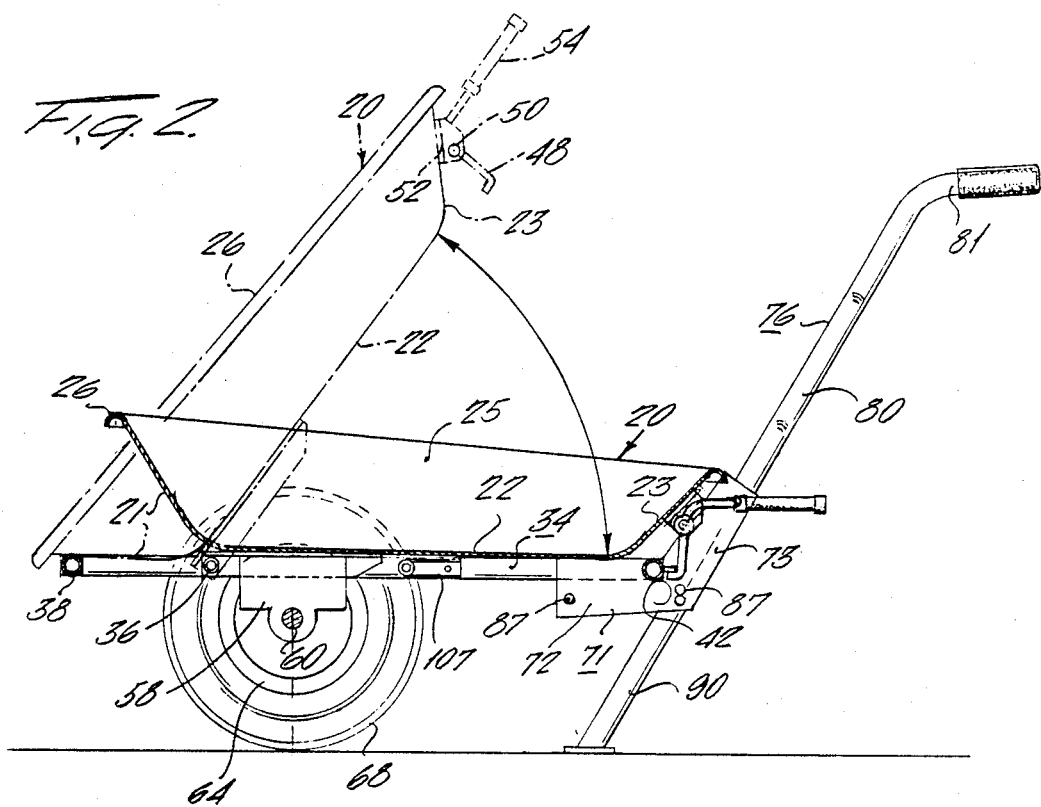

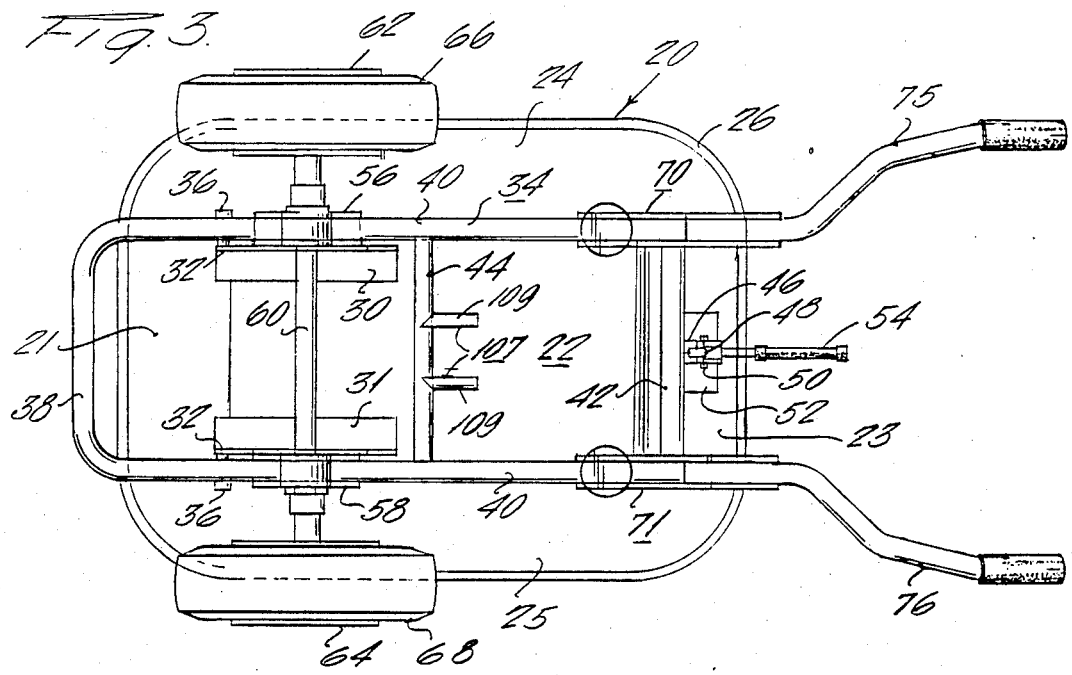
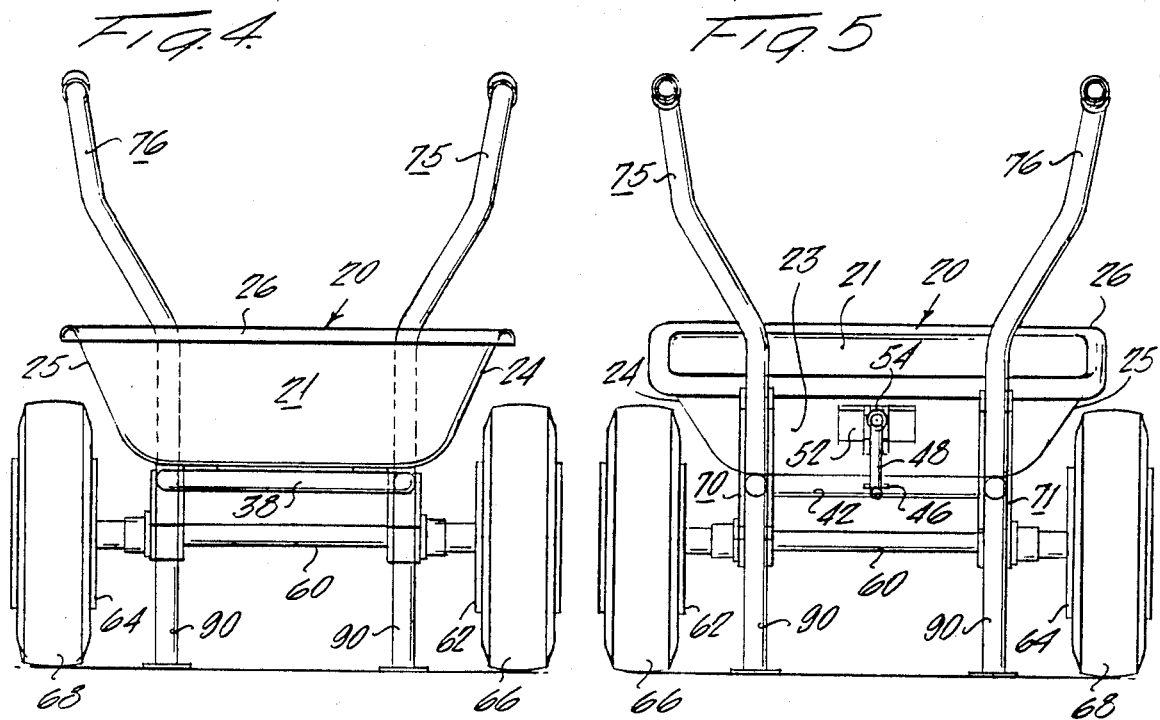
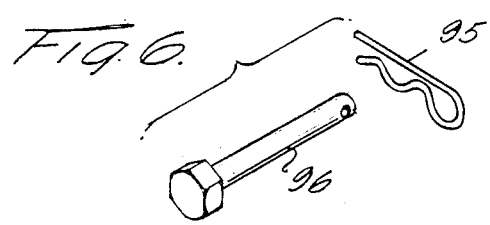

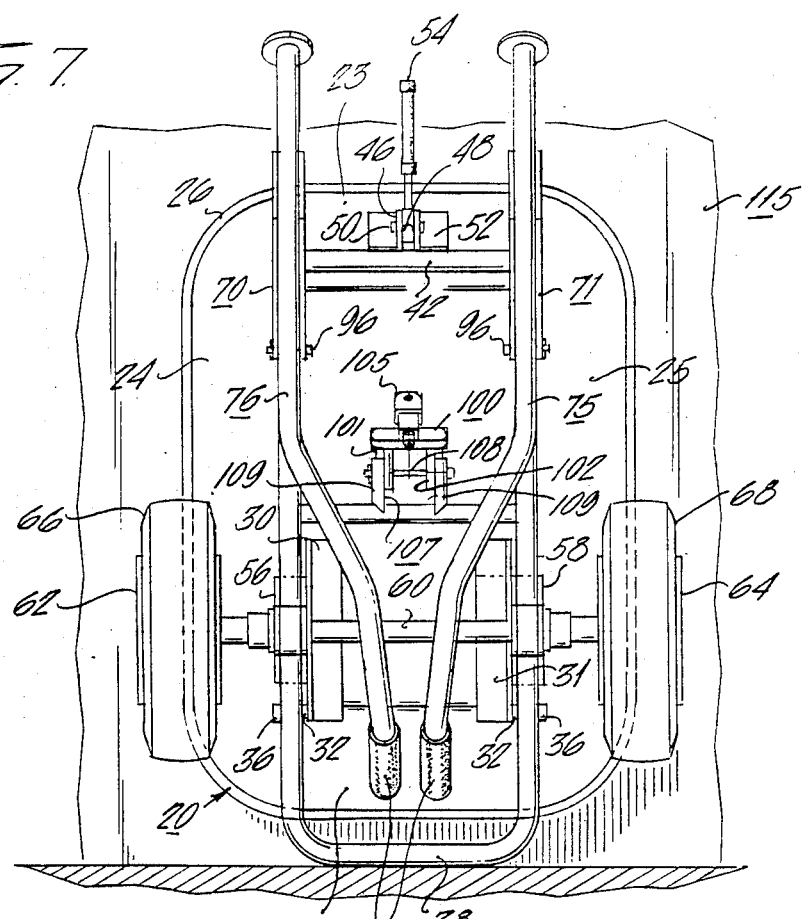
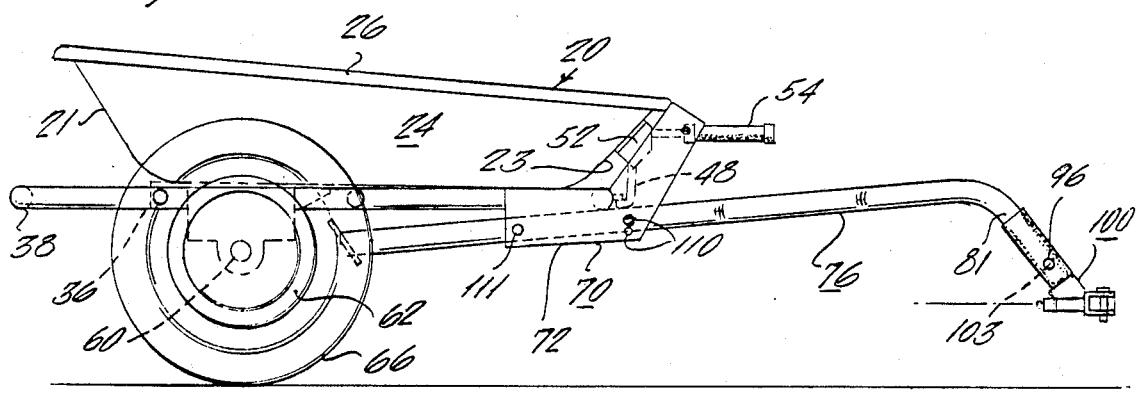
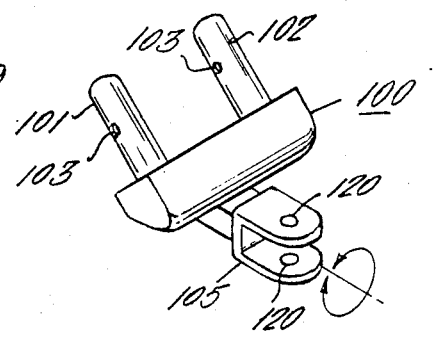

4,789,171

MULTIPURPOSE BARROW VEHICLE

FIELD OF THE INVENTION

The invention pertains to a convertible vehicle for hauling material and in particular, a barrow-type vehicle which can be adapted on one hand to be manually moved, and on the other hand, to be moved by means of a tow vehicle.

PRIOR ART

Wheelbarrows are of course well known and can be of the single or dual wheel type. Such barrows desirably have handlebars spaced apart wherein an operator stands behind the barrow between two rearwardly extending handlebars. The barrow in resting position has vertically extending legs at the rear of the barrow and generally a single wheel at the front thereof. The operator lifts the rear portion by means of the handles and pushes the barrow.

Such barrows have been adapted to be towed by a tractor such as a garden tractor by means of, for instance, a dolly which is affixed at the rear of the barrow and then the barrow is towed by means of a tow bar. Such an arrangement is shown in U.S. Pat. No. 4,052,079 issued Oct. 4, 1977 for WHEELBARROW TRANSPORT MEANS.

Such arrangements require separate structures to adapt or convert the wheelbarrow from a manual to a power-towed structure and vice-versa.

SUMMARY OF THE INVENTION

The present invention eliminates any need for separate structures to convert a manual wheelbarrow to a power-towed trailer and vice-versa.

A dial-wheel barrow vehicle has specially formed, detachable, secured elements which are shifted to selectively serve as either manual handlebars and legs for a push-type manual wheelbarrow, or arms for a barrow trailer to be towed from a power vehicle such as a garden tractor. The elements are divergent in a horizontal plane when used as wheelbarrow handles, and convergent in a horizontal plane when shifted within brackets to form the tow bar for a power-towed trailer.

The elements are pinned in place at one angle in a bracket in a generally vertical direction when used as wheelbarrow handles, and are pinned in a generally horizontal direction when used as tow arms. When used as wheelbarrow handles downwardly extending portions of the elements serve as wheelbarrow legs.

Additionally, the unit is constructed with a dump arrangement wherein the barrow portion is pivoted at the front thereof on a frame which is supported from the wheels. A latch mechanism holds the barrow securely to the frame in the barrow fixed position, and the latch is released to permit the barrow to be tilted with respect to the frame, wherein the contents of the barrow can be dumped.

The device is such that all components including pins and the tow clevis are positioned and secured right on the vehicle.

ADVANTAGES OF THE INVENTION

All parts are on the vehicle at all times. This eliminates the problem of lost or misplaced parts, as well as permitting conversions at different locations wherein the barrow can be transported, for instance, from one position to another under a manual mode, and then converted at a second location to a trailer-hitched mode without going back to the original location for parts.

The device can be changed from one setup to another in a matter of minutes. No tools are required for the conversion. It is simply a matter of using pins which are on vehicle at all times.

The vehicle can be easily stored by securing the handles into a folded position and then tilting or positioning the entire barrow against a vertical wall.

The two-wheeled design permits stability in both the manual and power-operated positions, as well as stability in the dump mode. The tow bar handles are adapted to accommodate both high and low hitch vehicles by using a plurality of holes which permits the tow bar arms to be positioned at different vertical levels.

The device can be used with an optional set of accessories, such as a kiddie seat whereby a small animal such as a goat or pony could be positioned between the handles when the device is in the manual mode, with a harness arrangement tying the handles to the animal.

BRIEF DESCRIPTION OF THE DRAWINGS

FIG. 1 is a plan view of the multipurpose vehicle of the invention arranged as a manually operated wheelbarrow.

FIG. 2 is a sectional side elevational view, taken on the line 2—2 of FIG. 1, showing certain details. There is shown in dot-and-dash outline the barrow unlatched and pivoted in a dump mode.

FIG. 3 is a bottom plan view of the wheelbarrow shown in FIGS. 1 and 2.

FIG. 4 is a front elevational view of the wheelbarrow shown in FIGS. 1 to 3.

FIG. 5 is a rear elevational view of the wheelbarrow shown in FIGS. 1 to 3.

FIG. 6 is an enlarged pictorial view of a quick-release fastener pin used in securing elements in various positions to the frame.

FIG. 7 is an elevational view of the vehicle, illustrated in FIGS. 1 to 5, in a non-use or stored mode, resting against a vertical wall of an enclosure, with the handle and tow bar elements repositioned as shown.

FIG. 8 is a side elevational view of the vehicle of the invention in a trailer mode. The elements are repositioned as shown to form a tow bar and the bifurcated universal insert placed within the elements as shown.

FIG. 9 is an enlarged perspective view of the bifurcated universal insert member.

DESCRIPTION OF THE PREFERRED EMBODIMENT

A barrow 20 in pan form having an inclined front portion 21, a bottom 22, a rearward portion 23 and sides 24 and 25, has a suitable curved lip portion 26 thereon. The size and shape of such pan or barrow 20 can vary but generally be of the well known prior art form in both capacity and design. Supporting angles 30 and 31 are affixed to the pan at the front bottom thereof as by welding. The flange portion of the angle lies in abutment against the bottom of the pan, while the web portion extends perpendicularly to the bottom of the pan.

Angles 30 and 31 are pivoted at 32 to a frame 34. The pivots can be suitably pins or bolts 36 which permissably may have bushings to permit movement with reduced friction. The frame 34 as seen for instance in FIG. 3 has a transverse front portion 38 which can act as a front bumper that extends beyond the pan in a forward direction. Sides 40 of the frame extend rearwardly from front to a rear crossbar 42. The frame has a reinforcing crossbar at 44. Crossbar 42 has secured thereto a keeper 46 which receives latch arm 48 pivoted at 50 on bracket 52 secured as by welding to the rear 23 of pan or barrow 20.

A latch handle 54 integral with latch 48 extends rearwardly from the barrow 20. When the barrow 20 is pivotally at rest on the frame, latch 48 engages keeper 46 to keep the barrow securely fixed to the frame, preventing rotational movement of the barrow at 32 with respect to the frame.

The frame has depending therefrom brackets 56 and 58 which journal a shaft 60 which has rotationally mounted thereon wheels 62 and 64, which in turn have mounted thereon tires 66 and 68, suitably of rubber or the like.

Frame 34 has secured thereto brackets 70 and 71 which form a channel construction in cross section, having a width within the channel to accommodate tubular elements as will be described. The brackets 70 and 71 are secured to frame 34 at the rear thereof so that a first portion 72 extends along the frame while a second portion 73 extends at an angle to the first portion in a generally upwardly and rearwardly direction to conform to the desired angle of the wheelbarrow arms as will be described.

Elements 75 and 76 are of tubular construction desirably of the same tubular diameter as frame 34. Elements 75 and 76 are constructed so as to, when viewed in the plane of FIG. 2, extend in a straight direction as at 80 with a second curved section as at 81. When viewed as in FIG. 1, there is a first section 83, an outwardly curved section 84, a lightly rearwardly curved section 85 and a more rearwardly directed section 86. Portion 83 is, when viewed from FIG. 1, in a direction longitudinal of the barrow and wheels, directed transversely outwardly to an extent which permits the user to stand between sections 85 and 86 as is well known in operating the wheelbarrow. The elements are secured to brackets 70 and 71 at portion 73 of the brackets by virtue of pins of a type shown in FIG. 6 which extend through holes in the brackets as at 87, and in the elements 75 and 76, so that by means of two pins at each element, the element is secured to the bracket and to the frame of the barrow in the position shown in FIGS. 1 through 5 inclusive. In this position, the device or vehicle operates in the usual manner of a wheelbarrow wherein the barrow pan 20 can be loaded, the operator take a position between the arms or handles of the barrow, and move or maneuver the barrow as desired.

Portions 90 of the elements 75 and 76 extend, when in the positions of FIGS. 1 through 5, downwardly to permit the rearward portion of the barrow to rest when the barrow is in a stationary position, as is well known in prior art barrows.

The barrow may be dumped by an operator tilting the entire frame on axle 60 until the front frame at 38 rests on the ground wherein the operator can continue the rotation until the contents of the barrow are dumped.

In the alternative, the operator can rest the barrow on the ground as seen in FIG. 2 and then the latch mechanism 48 can be released from keeper 46 by lifting on handle 54. The handle then acts as a lifting arm wherein the barrow or pan 20 can be rotated on pivot 36 as shown by the arc in FIG. 2 with the arrows thereon, whereby the pan can be lifted into the dump position as shown in phantom lines in FIG. 2. The front of the barrow comes in contact with the front of the frame at 38 to provide a stable rest when in the dump mode. After dumping the pan can be rotated back into its fixed position and latched to the frame, as shown in solid lines in FIG. 2.

The vehicle can be converted to a tractor-pulling mode by repositioning elements 75 and 76 into the position shown in FIG. 8. In this position, the elements are completely removed from the barrow from the position shown in the manual mode in FIGS. 1 through 5. This is accomplished by simply removing retaining spring member 95 from pin 96, and then withdrawing pin 96 from the bracket and arms.

The elements 75 and 76 are then switched from left to right and right to left when viewed from behind. The elements are also inserted into the brackets 70 and 71 in the horizontal portion of the bracket at the bottom thereof, at 72, and the pins inserted to support the arms in a generally horizontal position as best seen in FIG. 8. The arms now instead of diverging from one another as they extend rearwardly, as seen in FIGS. 1 through 5 in a manual position, converge so that portions 81 of the handles abut in close relationship wherein a bifurcated universal insert member 100 as seen in FIG. 9 is inserted into the ends of the handles. The handles have thereon rubber hand grips which are not removed. However, the ends of the arms are open. This is accomplished by carefully cutting the ends out of the rubber grips but leaving a protective edge thereon. The clevis has spaced prongs 101 and 102 which conform to the spacing of the ends 81 of the arms when they are in the trailer mode of FIG. 8. Again, retaining pins 96 are inserted at 103 to secure the prongs and thus the universal insert member into place at the end of the tow bar arms as seen in FIG. 8.

The wheelbarrow handles of FIGS. 1 through 5 now become the tow bar arms of FIG. 8. The insert member 100 has a clevis 105 which has therein holes 120 which are made to conform to the tow member of a garden tractor or other power vehicle. The universal joint is such that the clevis can be made to rotate 360° to achieve a suitable hitch. The bifurcated universal insert 100 when not in use is mounted on bracket 107 extending from the middle frame member as best seen in FIG. 7. Such bracket has an extended pin 108 which passes through rearward brackets 109 wherein pin 108 can be removed and reinserted to selectively secure bifurcated member 100 through prongs 101 and 102.

Bracket 70 has a pair of holes, one above the other, at 110 whereby the tow bar arms can be pivoted around pin 111 so that a relatively upward or downwardly position can be achieved whereby the tow arms are adjusted to permit or accommodate both high and low vehicles such as different size tractors or the like.

The device can be stored as seen in FIG. 7 in a compact vertical position against a wall 115 by repositioning the elements 75 and 76 into the brackets as seen in FIG. 7. In such storage mode, the bent portion of the handles converge toward one another as in the tow position of FIG. 8, but the elements are positioned so that the converging portions are directed toward the front or downward portion of the barrow as seen in FIG. 7 with the leg portions extending upwardly or rearwardly. In this way, the elements are in effect tucked underneath the barrow with the pins again being used to secure the elements in the brackets. The vehicle can rest against the wall on the frame front portion so that a minimum amount of floor space is occupied in the storage position.

It will be seen in all of the above descriptions that the vehicle can be readily converted from a manually operated wheelbarrow to a power vehicle trailer arrangement with a minimum of rearrangement and with all necessary parts carried right with the vehicle, with no separate elements necessary, such as dollies or the like. The reverse conversion from a power vehicle trailer to a manually operated barrow likewise can be achieved simply and quickly. Additionally, the vehicle can be placed in a storage mode whereby the parts are compactly secured into a minimum of space, permitting a vertical storage, occupying a minimum of horizontal floor space.

In both the trailer and wheelbarrow mode, the pan can be dumped with respect to the frame in an easily operated pivotal arrangement whereas a handle can both operate a latch release and a dump arrangement.

Additionally, the wheelbarrow in a manual mode can be readily dumped off a front frame member which acts as a pivot. Additionally, the vehicle converted into a trailer mode can be readily maneuvered into a hitching and an unhitching position on the trailer since the tow bar arms converge into a single grip area, with the dual wheels acting along with the grip area to form an easily maneuverable and stable vehicle arrangement.

Additionally, when the vehicle is in a manually operating mode, the widely dispersed vertical legs along with the dual wheels provide a most secure four-point support system for the barrow.

It will be seen that the above vehicle permits complete versatility for a barrow vehicle in a simple and reliable manner. There are no parts which can be easily misplaced since all components are intended to be either in operating or storage position, right on the vehicle.

I claim:

1. A vehicle adapted to be selectively used either as a wheelbarrow manually operated, or a trailer adapted to be hitched to a pulling vehicle, comprising
   a pan,
   a frame having the pan secured thereto, supporting wheels journalled on the frame, a pair of angled brackets secured to the frame,
   a pair of bent offset elongated members, each member having a hand grip portion at an offset end thereof adapted to be detachably and interchangeably secured in the said brackets in various positions and,
   a hitch attachment for securing the members at their offset ends to a tow vehicle, wherein
   in a first position, the members are secured to the brackets in a substantially horizontal position with the offset portions of the members converging toward one another to provide a tow bar to be secured to a tow vehicle, and in an alternative second position, the members are secured to the brackets in a substantially inclined position with the offset portions of the members diverging to serve as handles in a manually operated wheelbarrow and with the opposite ends of the members extending downwardly to serve as support legs for the wheelbarrow.

2. A vehicle of claim 1 wherein the members are secured to the frame by pins passing through holes in the brackets and the elements.

3. A device of claim 1 wherein the members are tubular members.

4. A vehicle of claim 1 wherein the members can be selectively secured in a third position in the brackets whereby the offset portions extend forwardly beneath the frame when the vehicle is stored in a vertical position.

5. A vehicle of claim 1 wherein the pan is pivoted to the frame at the front thereof and releasably latched to the frame at the rear thereof.

6. A vehicle of claim 5 wherein the pan is latched by means of a mechanism having a handle which alternatively serves to unlatch the pan from the frame and permit the pan to be pivoted on the frame by means of said handle.

7. A vehicle of claim 1 wherein the hitch attachment includes a bifurcated connecting member, having a pair of tongs adapted to be inserted into open ends of the elongated members, and having a clevis thereon adapted to engage a tow vehicle.

8. A vehicle of claim 1 wherein the tow bar is adjustable in height when the elongated members are in the second position.

* * * * *